(12) United States Patent
Oh et al.

(10) Patent No.: US 7,415,190 B2
(45) Date of Patent: Aug. 19, 2008

(54) OPTICAL RECORDING MEDIUM TO DISPLAY STORED COMMAND ALONG WITH CONTENT, AND APPARATUS AND METHOD TO PLAY THE SAME

(75) Inventors: Yeong-heon Oh, Seoul (KR); Young-ki Byun, Gyeonggi-do (KR); Jeong-joo Jeong, Gyeonggi-do (KR); Young-ho Jung, Seoul (KR)

(73) Assignees: Samsung Electronics Co., Ltd., Suwon-si (KR); Bitwin Corporation, Seoul (KR)

( * ) Notice: Subject to any disclaimer, the term of this patent is extended or adjusted under 35 U.S.C. 154(b) by 592 days.

(21) Appl. No.: 10/143,838

(22) Filed: May 14, 2002

(65) Prior Publication Data

US 2003/0099181 A1 May 29, 2003

(30) Foreign Application Priority Data

Nov. 29, 2001 (KR) ............................... 2001-74963

(51) Int. Cl.
*H04N 5/91* (2006.01)
(52) U.S. Cl. ........................................ 386/95; 386/126
(58) Field of Classification Search ................ 386/1, 386/45, 95, 125–126; 369/43, 47.1, 47.2, 369/52.1, 53.1; *H04N 5/781*
See application file for complete search history.

(56) References Cited

U.S. PATENT DOCUMENTS

| 4,942,551 | A | 7/1990 | Klappert et al. | |
|---|---|---|---|---|
| 5,497,241 | A | 3/1996 | Ostrover et al. | |
| 6,108,281 | A | 8/2000 | Tozaki et al. | |
| 6,285,823 | B1 * | 9/2001 | Saeki et al. | 386/95 |
| 6,381,398 | B1 * | 4/2002 | Yamauchi et al. | 386/52 |
| 6,504,996 | B1 * | 1/2003 | Na et al. | 386/125 |
| 6,532,334 | B1 * | 3/2003 | Kikuchi et al. | 386/68 |
| 2005/0008338 | A1 * | 1/2005 | Yamauchi et al. | 386/95 |
| 2005/0100326 | A1 * | 5/2005 | Kikuchi et al. | 386/95 |

FOREIGN PATENT DOCUMENTS

EP 677 842 10/1995

(Continued)

OTHER PUBLICATIONS

Affidavit with English translation.

(Continued)

*Primary Examiner*—Huy T Nguyen
(74) *Attorney, Agent, or Firm*—Staas & Halsey LLP

(57) ABSTRACT

An optical recording medium for recording a predetermined command code at a predetermined region of contents, an apparatus and method to play the optical recording medium, which executes a predetermined command when the contents are played so that the predetermined command is moved into contents at a predetermined portion of a screen. The method of playing an optical recording medium includes analyzing a signal that is read from the optical recording medium, and searching whether a predetermined command is recorded in a reserved region in a predetermined packet, storing the searched predetermined command and executing the stored predetermined command with a command execution key, and displaying the result of the command that is executed with the command execution key on a screen of the optical recording medium.

18 Claims, 3 Drawing Sheets

FOREIGN PATENT DOCUMENTS

| | | |
|---|---|---|
| EP | 788 105 | 8/1997 |
| EP | 0 871 160 | 10/1998 |
| EP | 0 903 732 | 3/1999 |
| EP | 1 102 249 | 5/2001 |
| GB | 2382714 A | 6/2003 |
| JP | 10-075448 | 3/1998 |
| JP | 11-161663 | 6/1999 |
| JP | 11-162120 | 6/1999 |
| JP | 2001-126398 | 5/2001 |

OTHER PUBLICATIONS

Combined Search and Examination Report.

Japanese Office Action dated Sep. 7, 2004.

Japanese Office Action mailed on Jun. 28, 2005 in Japanese Patent Application No. 2002-124760 which corresponds to U.S. Appl. No. 10/143,838.

* cited by examiner

OPTICAL RECORDING MEDIUM TO DISPLAY STORED COMMAND ALONG WITH CONTENT, AND APPARATUS AND METHOD TO PLAY THE SAME

CROSS-REFERENCE TO RELATED APPLICATION

This application claims the benefit of Korean Application No. 2001-74963, filed Nov. 29, 2001, in the Korean Intellectual Property Office, the disclosure of which is incorporated herein by reference.

BACKGROUND OF THE INVENTION

1. Field of the Invention

The present invention relates to an optical recording medium on which predetermined command code is recorded in a predetermined region in which contents are stored, and an apparatus and method to play the optical recording medium and which executes a predetermined command when the contents are played so that the predetermined command is moved into contents at a predetermined portion of a screen on which the contents are displayed.

2. Description of the Related Art

In general, a digital versatile disc (DVD) is the same size as a compact disc (CD) having a diameter of 12 cm and a thickness of 1.2 mm but is capable of storing 7 times as much data as a CD. A CD has a capacity to hold data sufficient to play for 74 minutes (i.e., to play a capacity of 688 megabytes). A DVD has a capacity of 4.7-17 gigabytes depending on whether the DVD is single sided or double sided and is formed of a single layer or multiple layers. Since the DVD has a large capacity, the DVD can provide better video than the CD. Further, the DVD need not use a moving picture experts group (MPEG)-1 compression method, which places more weight on high compression than on picture quality, but instead can use an MPEG-2 compression method, which places more weight on picture quality.

By providing audio and subtitles and by assigning a space in which information including all kinds of set-up menus are stored, many functions can be provided. These functions can include an interactive (conversation-type) progress function to reproduce contents according to a user's selection, a multilingual subtitle processing function to display a maximum of 32 languages, a multilingual speech processing function to provide sound tracks in a maximum of 8 languages, a digital surround function that is provided through six speakers (e.g., front-right, front-left, back-right, back-left, central, middle and low frequency speakers), a multi-story function in which a user selects from many preset stories in the case of a movie, a multi-angle function in which a scene that is filmed in various angles is provided and a viewer can select a desired angle and can view a scene from that angle, and a viewing-restriction function to restrict viewing by grading each scene.

Among the set-up menus of the DVD, there is a sub-title menu to set the language and the subtitles. The sub-title menu is useful and is often used to allow a user to enjoy various discs in different languages. However, a conventional DVD includes only a subtitle processing function in a selected language, and thus, a learning function cannot be enhanced.

SUMMARY OF THE INVENTION

To solve the above and other problems, it is an object of the present invention to provide an optical recording medium on which a predetermined command code is recorded in a predetermined region in which contents are stored so that, during reproduction, a predetermined command is moved into a predetermined portion of a screen on which the contents are displayed.

It is another object of the present invention to provide an apparatus to play an optical recording medium and which executes a predetermined command that is recorded in a predetermined region in which contents are stored when the optical recording medium is played so that the predetermined command is moved into a predetermined portion of a screen on which the contents are displayed.

It is a further object of the present invention to provide a method of playing an optical recording medium, the method including executing a predetermined command that is recorded in a predetermined region in which contents are stored when the optical recording medium is played so that the predetermined command is moved into a predetermined portion of a screen on which the contents are displayed.

Additional objects and advantages of the invention will be set forth in part in the description which follows and, in part, will be obvious from the description, or may be learned by practice of the invention.

Accordingly, to achieve the above and other objects, there is provided an optical recording medium according to an embodiment of the invention on which contents and a predetermined command code are recorded so that a predetermined marking and a predetermined command are moved into a predetermined position of a screen on which the contents are displayed in a reserved region, the predetermined command being in a predetermined packet of the contents.

According to an aspect of the invention, the predetermined marking is an identification code that indicates the predetermined command is recorded on the optical recording medium, and the predetermined command is one of a command to set predetermined parameters of a system to play the contents and another command to display information at a predetermined portion of the screen on which the contents are displayed.

According to a further embodiment of the invention, an apparatus to play an optical recording medium, which stores a predetermined identification code and a predetermined command in a reserved region in a predetermined stream of contents, includes a signal processor to read the identification code and the predetermined command recorded in the reserved region of the predetermined stream from the recording medium and to signal-process the predetermined stream to display the contents on a screen, and a controller to analyze the predetermined stream read by the signal processor, to search the predetermined stream to determine whether the predetermined command is recorded in the reserved region, and to control the execution and display of the predetermined command according to the search result.

According to an aspect of the invention, the predetermined command is one of a command to set predetermined parameters of a system to play the contents and another command to display information in a predetermined portion of the contents while displayed on the screen, and the controller searches to determine whether the predetermined command is recorded in the reserved region in the predetermined stream depending on whether the identification code is recorded in the reserved region, and the identification code indicates that the predetermined command is recorded on the optical recording medium.

According to another aspect of the invention, the identification code and the predetermined command for which the controller searches are in the reserved region of a predetermined information table, which is used to play the optical recording medium.

According to yet another aspect of the invention, the identification code and the predetermined command are searched for in the reserved region of a predetermined presentation control information (PCI) packet or a data search information (DSI) packet, which is used to play the optical recording medium.

According an additional embodiment of the invention, a method of playing an optical recording medium includes analyzing a signal that is read from the optical recording medium, and searching to determine whether a predetermined command is recorded in a reserved region in a predetermined packet, if the predetermined command is recorded, storing the searched predetermined command and executing the stored predetermined command with a command execution key, and displaying the result of the executed predetermined command on a screen.

According to an aspect of the invention, in the analyzing the signal, the determination as to whether the predetermined command is recorded depends on whether a predetermined identification code is recorded in the reserved region in the predetermined packet, and the predetermined command is one of a command to set predetermined parameters of a system to play the optical recording medium and another command to display on a screen information stored in a predetermined portion of the optical recording medium, and if the predetermined command is executed, either the predetermined parameters of the system to play the optical recording medium are reset, or information in the predetermined portion of the optical recording medium is displayed on the screen.

BRIEF DESCRIPTION OF THE DRAWINGS

The above and other objectives and advantages of the present invention will become more apparent and more readily appreciated by describing in detail embodiments thereof with reference to the accompanying drawings in which.

DETAILED DESCRIPTION OF THE EMBODIMENTS

Figure 1:
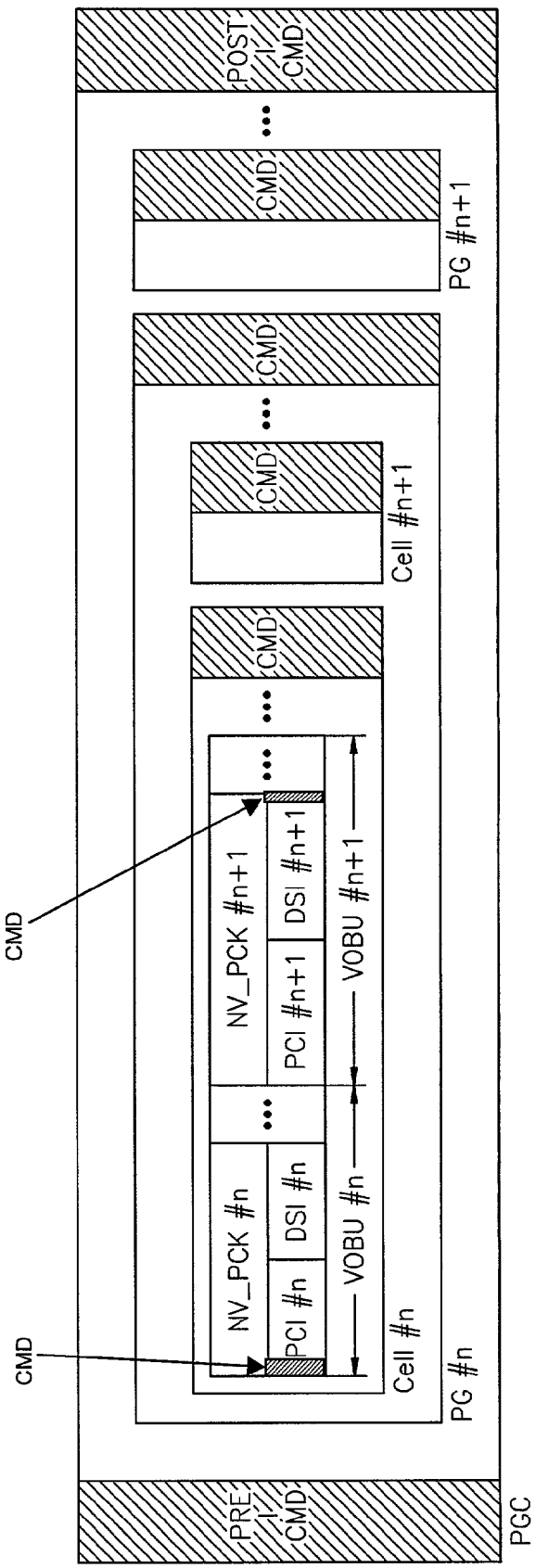
FIG. 1 illustrates the format of a signal stored on an optical recording medium according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
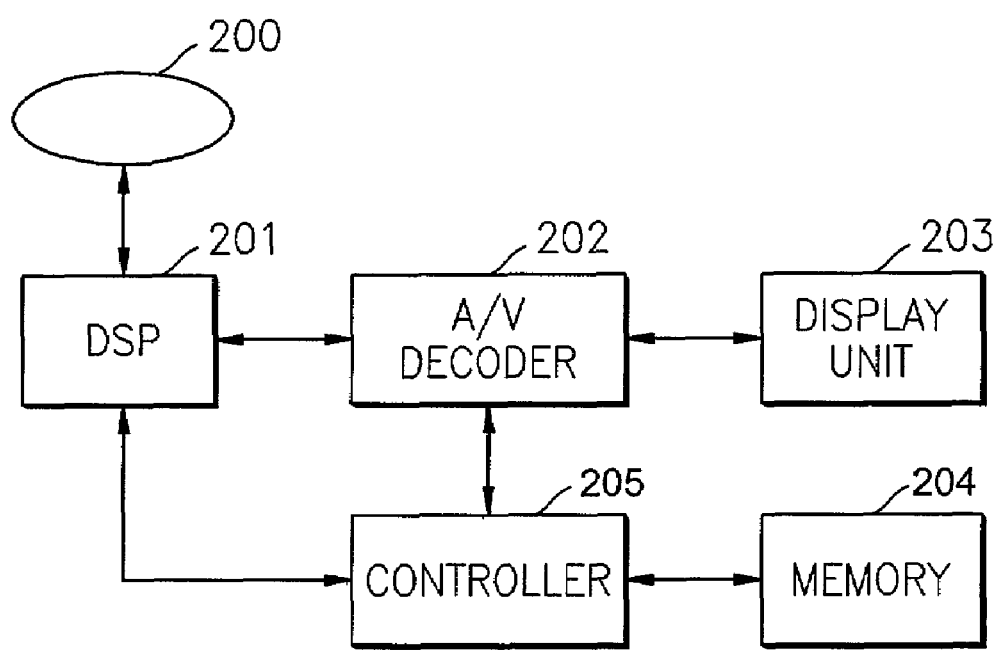
FIG. 2 is a block diagram of the structure of an apparatus to play the optical recording medium according to an embodiment of the present invention.

FIG. 1 illustrates the format of a signal stored on an optical recording medium according to an embodiment of the present invention. FIG. 2 is a block diagram illustrating the structure of an apparatus to play the optical recording medium according to an embodiment of the present invention. The apparatus includes an optical disc 200, a DSP 201, an A/V decoder 202, a display unit 203, a memory 204, and a controller 205.

Figure 3:
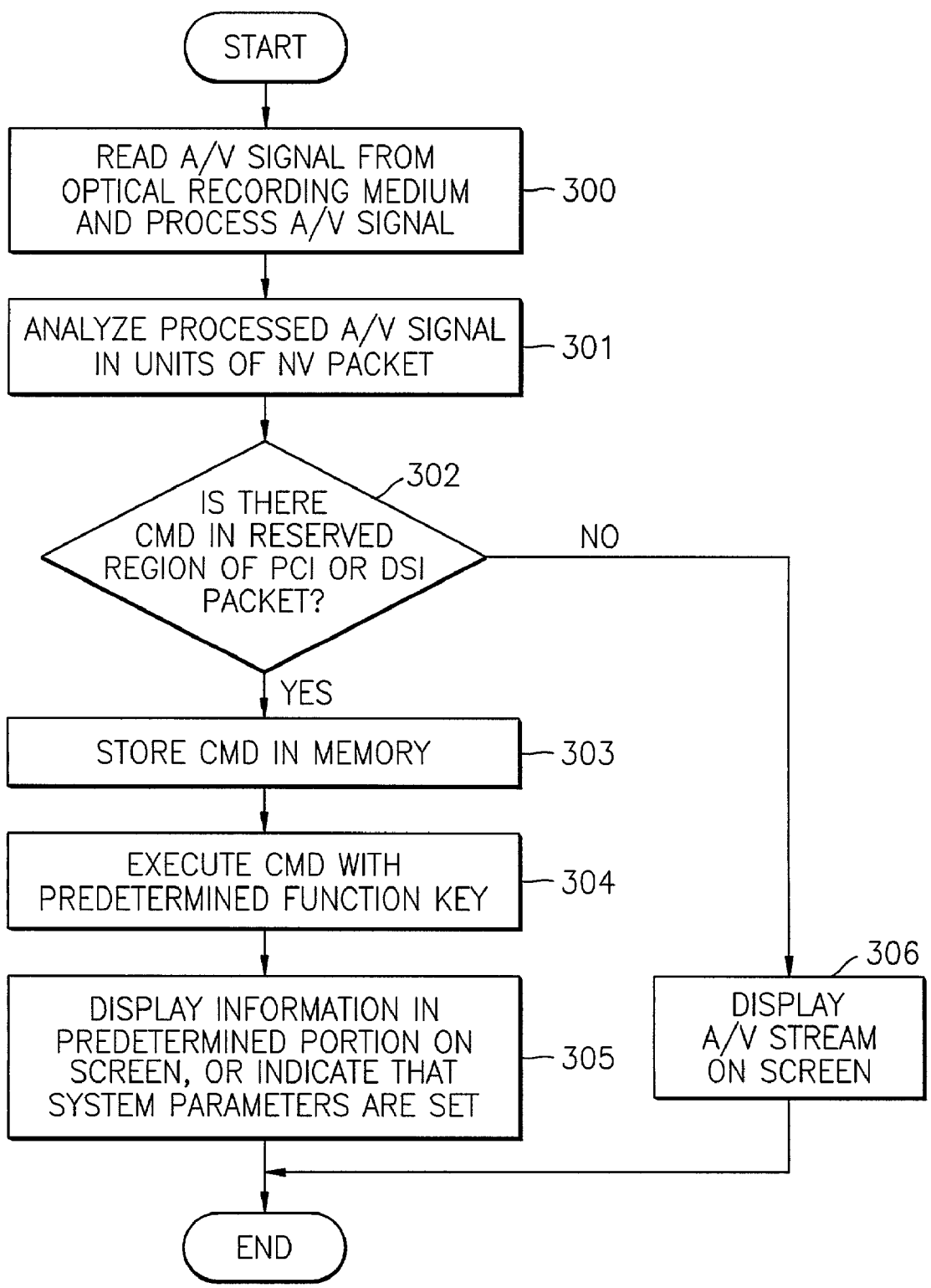
FIG. 3 is a flowchart of a method of playing the optical recording medium according to an embodiment of the present invention.

FIG. 3 is a flowchart of a method of playing the optical recording medium according to an embodiment of the present invention. The method includes reading an A/V signal from the optical recording medium and processing the A/V signal (300), analyzing the processed A/V signal in units of the navigation (NV) packet (301), determining whether there is a command (CMD) in a reserved region of a presentation control information (PCI) or a data search information (DSI) packet (302), storing the CMD in a memory (303), executing the CMD with a predetermined function key (304), displaying information at a predetermined portion on a screen, or indicating that system parameters are set (305), and displaying an A/V stream on the screen (306).

Hereinafter, the present invention will be described in detail with reference to FIGS. 1 through 3.

A video object unit (VOBU) is recorded on an optical disc 200, or is a minimum unit of an MPEG stream. A cell is formed by a predetermined number of VOBUs, and a page (PG) is formed by a predetermined number of the cells. A page chain (PGC), which is a maximum unit of the MPEG stream, is formed by a predetermined number of PGs.

The VOBU is formed of a predetermined number of navigation (NV) packets. The NV packets include a presentation control information (PCI) packet and a data search information (DSI) packet. The PCI packet includes a total of 60 bytes and stores presentation control information such as highlight information, VOBU category information, and non seamless angle information. 32 bytes of the 60 bytes is a reserved region.

The DSI packet includes a total of 1017 bytes and stores data search information such as VOBU category information and seamless angle information. 471 bytes of the 1017 bytes is a reserved region.

When contents are recorded on the optical disc 200, a predetermined command and an identification code to display the predetermined command are inserted in the reserved regions of the PCI packet and the DSI packet. Thus, the predetermined command is moved into a predetermined portion of a screen when the contents are played. A similar operation is performed when the contents are transmitted in an MPEG stream.

The identification code that is inserted in the reserved regions of the PCI packet and the DSI packet indicates that the predetermined command is recorded on the optical disc 200. The predetermined command includes a movement command, such as GoTo, Link, and Jump, or a command to set predetermined parameters of a system, such as Compare, SetSystem, and Set. The movement command provides position information to display information at a predetermined portion of a screen on which the contents are displayed. As such, when the movement command is played, information is displayed at a predetermined portion of the screen on which the contents are displayed.

The command to set predetermined parameters of a system sets information, such as audio or subtitle. As such, when the command to set the predetermined parameters of the system is played, the predetermined parameters of the system are reset.

The apparatus and method to play the optical disc 200 in which the predetermined command and a code to identify the predetermined command are inserted will be described below.

In operation 300, an A/V signal is read from an optical recording medium 200 and is processed. While not specifically shown, a pickup in the DSP 201 reads the A/V signal from the optical disc 200. The DSP descrambles and eight to fourteen modulates (EFM) the read the A/V signal. The A/V decoder 202 decodes the processed A/V signal and outputs the decoded A/V signal to the display unit 203 to be displayed on a screen of the display unit 203.

In operations 301 and 302, the decoded A/V signal is analyzed in units of the NV packet, and it is determined whether there is a predetermined command (CMD) in a reserved region of the PCI or DSI packet of each analyzed NV packet. Specifically, the controller 205 analyzes the decoded A/V stream in units within the NV packet, searches for an identification code that is inserted in the reserved region of the PCI or DSI packet of each NV packet, and determines whether the predetermined CMD is inserted in the reserved region of the PCI or DSI packet.

In operation 303, when there is the predetermined CMD in the reserved region of the PCI or DSI packet, the predetermined CMD is stored in the memory 204. Once the predetermined CMD is stored, the controller 205 outputs to the display unit 203 that there is the predetermined CMD in the reserved region of the PCI or DSI packet and waits for a predetermined function key for the execution of command to be entered.

In operation 304, if a user enters the predetermined function key, the CMD is executed. If the predetermined function key is entered, the controller 205 searches for the predetermined CMD that is stored in the memory 204, and moves the predetermined CMD into a corresponding position of the screen, or resets system parameters.

If the predetermined CMD is executed, in operation 305, information is displayed at a predetermined portion of the screen or it is indicated that system parameters are set. The indication that the system parameters are set can be through the screen, a display on the disk player, using lights, sounds, or other similar mechanisms by which a user is informed of a status of an apparatus.

In operation 306, the A/V stream is displayed on the screen. That is, in a case where there is no predetermined CMD in the reserved region of the PCI or DSI packet, the decoded A/V stream is output to the display unit 203.

As described above, according to the present invention, a predetermined command can be moved into contents at a predetermined position of a screen by executing the predetermined command that is recorded in a predetermined region when an optical recording medium is played. As such, information is displayed at a predetermined position of a screen in addition to contents. The information can be related to grammar and conversations being displayed on the screen which enhances a learning effect. The predetermined position can be moved to various portions of the screen such that it is possible for the information to be displayed as a label at various positions adjacent to different objects being displayed on the screen. However, it is understood that the information can also be in graphical or animated form.

Further, while described in terms of content recorded on an optical recording medium, it is understood that the predetermined command could also be transmitted with a data stream containing the content.

It is understood that the controller 205 and/or the decoder 202 can be implemented using a computer, and that the method shown in FIG. 3 can be implemented using a computer program encoded on a computer readable medium to be executed by the computer.

In an embodiment of the apparatus implementing the present invention, the command may include at least one of: changing the parameters to display a predetermined language in a subtitle to be displayed on the screen and changing the parameters to play an audio track of a predetermined language.

In an embodiment of the computer readable medium, the executed command may include at least one of: changing the parameters to display a predetermined language in a subtitle to be displayed on the screen and changing the parameters to play an audio track of a predetermined language.

While this invention has been particularly shown and described with reference to preferred embodiments thereof, it will be understood by those skilled in the art that various changes in form and details may be made therein without departing from the spirit and scope of the invention as defined by the accompanying claims and equivalents thereof.

What is claimed is:

1. An apparatus comprises an optical recording medium to store information to cause a reproducing apparatus to display at least portions of the information on a screen, the information comprising:
   a marking;
   a command;
   contents, one of said contents comprising a packet having a reserved region; and
   a predetermined command code recorded on the optical recording medium, so that, when said contents are reproduced from the optical recording medium by the reproducing apparatus, said marking and said command are moved onto a predetermined position of the screen on which said contents are being displayed as streaming contents;
   wherein said predetermined command code is recorded on the reserved region of the packet,
   wherein said marking is an identification code that indicates that said command is recorded on the optical recording medium,
   wherein whether the identification code is recorded in the reserved region of the recording medium determines whether the command is recorded in the reserved region, wherein the command is one of a command to set predetermined parameters of the apparatus and another command to display information on a predetermined portion of the screen on which the contents are being displayed,
   wherein:
      the command is to change the parameters to display a predetermined language in a subtitle to be displayed on the screen and to change the parameters to play an audio track of a predetermined language,
      the information displayed on the predetermined portion of the screen includes information on grammar related to the contents being displayed on the screen, and
      the information displayed on the predetermined portion of the screen includes information on phrases being conveyed using the contents being displayed on the screen,
   wherein the identification code and the predetermined command code in the reserved region are located in one of a predetermined presentation control information (PCI) packet and a data search information (DSI) packet, which are used by the apparatus to play the optical recording medium.

2. The apparatus of claim 1, wherein said command is one of a command to set predetermined parameters of the reproducing apparatus used to play said contents and another command to display information on the predetermined portion of the screen on which said contents are displayed.

3. An apparatus to play an optical recording medium, the optical recording medium storing an identification code and a command in a reserved region in a stream of contents, the apparatus comprising:
   a signal processor to read the stream including the identification code and the command and the contents from the optical recording medium and to signal-process the stream to be displayed on a screen as streaming contents; and
   a controller to analyze the read stream and to determine whether the command is recorded in the reserved region, to display an indicator of the identification code along with the streaming contents, and to control the execution and display of the command if the command is recorded in the reserved region,
   wherein said controller determines whether the command is recorded in the reserved region based upon whether the identification code is recorded in the reserved region of the recording medium,
   wherein the command is one of a command to set predetermined parameters of the apparatus and another command to display information on a predetermined portion of the screen on which the contents are being displayed, and
   wherein:
      the command is to change the parameters to display a predetermined language in a subtitle to be displayed on the screen and to change the parameters to play an audio track of a predetermined language,
      the information displayed on the predetermined portion of the screen includes information on grammar related to the contents being displayed on the screen, and
      the information displayed on the predetermined portion of the screen includes information on phrases being conveyed using the contents being displayed on the screens,
   wherein said controller searches for the identification code and the command in the reserved region of one of a predetermined presentation control information (PCI) packet and a data search information (DSI) packet, which are used by the apparatus to play the optical recording medium.

4. The apparatus of claim 3, wherein the identification code indicates that the command is recorded on the optical recording medium.

5. The apparatus of claim 3, wherein said controller searches a predetermined information table for the identification code and the command, the predetermined information table includes the reserved region and is used by the apparatus to play the contents recorded on the optical recording medium.

6. A method of playing an optical recording medium, the method comprising:
   analyzing a signal, including a packet, read from the optical recording medium while displaying streaming content on a screen;
   determining whether a command is recorded in a reserved region of the packet;
   if the command is determined to be recorded in the reserved region, displaying an indicator of the command along with the streaming content and storing the command;
   executing the stored command when a command execution key is activated; and
   displaying a result of the executed command on the screen,
   wherein said determining whether the command is recorded in the reserved region comprises searching to determine whether a predetermined identification code is recorded in the reserved region in the packet,
   wherein the command is one of a command to set predetermined parameters of a system that plays the optical recording medium, and another command to display information on a predetermined portion of the screen,
   wherein:
      the command is to change the parameters to display a predetermined language in a subtitle to be displayed on the screen and to change the parameters to play an audio track of a predetermined language,
      the information displayed on the predetermined portion of the screen includes information on grammar related to the contents being displayed on the screen, and
      the information displayed on the predetermined portion of the screen includes information on phrases being conveyed using the contents being displayed on the screen, and
   wherein said determining whether the command is recorded in the reserved region includes searching for the identification code and the command in the reserved region of one of a predetermined presentation control information (PCI) packet and a data search information (DSI) packet, that are used to play the optical recording medium.

7. The method of claim 6, wherein, if the command is executed, performing one of:
   resetting predetermined parameters of a system that plays the optical recording medium, and
   displaying information corresponding to the executed command on a predetermined portion of the screen.

8. An apparatus to reproduce a received stream of contents, comprising:
   a signal processor to receive the stream and to process the stream to display the contents on a screen as streaming contents;
   a controller to analyze packets within the contents and to determine whether one of the packets contains a command in a reserved region of the one packet, to indicate that the command exists in the one packet using a predetermined portion of the screen while the contents are being displayed, and to execute the command,
   wherein:
   the one packet comprises a navigation (NV) packet in a video object unit (VOBU) of an MPEG stream, and
   said controller searches the reserved region of one of a presentation control information (PCI) and a data search information (DSI) to determine whether the NV packet contains the command,
   wherein the command is to display information on the predetermined portion of the screen while the contents are being displayed,
   wherein the command is to set parameters of the apparatus and the set parameters include one of an audio parameter and a subtitle parameter, and
   wherein:
      the command is to change the parameters to display a predetermined language in a subtitle to be displayed on the screen and to change the parameters to play an audio track of a predetermined language,
      the information displayed on the predetermined portion of the screen includes information on grammar related to the contents being displayed on the screen, and the information displayed on the predetermined portion of the screen includes information on phrases being conveyed using the contents being displayed on the screen.

9. The apparatus of claim 8, wherein the command is a movement command that provides positional information as to the predetermined portion of the screen on which the information is to be displayed.

10. The apparatus of claim 9, wherein the movement command is one of GoTo, Link, and Jump.

11. The apparatus of claim 8, wherein the command is one of Compare, SetSystem, and Set.

12. The apparatus of claim 8, wherein:
the one packet comprises a navigation (NV) packet in a video object unit (VOBU) of an MPEG stream, and
said controller searches the reserved region of one of a presentation control information (PCI) and a data search information (DSI) to determine whether the NV packet contains the command.

13. A computer readable medium encoded with processing instructions for implementing a method of reproducing a received stream of contents to be displayed on a screen performed by a computer, the method comprising:
analyzing a packet in the received stream while displaying the contents as streaming contents;
determining whether a command is recorded in a reserved region of the packet;
if the command is determined to be recorded in the reserved region, displaying an indicator of the command along with the streaming contents and storing the command;
executing the stored command when an execution command is received; and
outputting a result of the executed command to be displayed at a position on the screen along with a reproduced stream,
wherein said determining whether the command is recorded comprises determining whether an identification code is recorded in the reserved region of the packet,
wherein the command is one of a command to set predetermined parameters of a system that reproduces the stream, and another command to display information corresponding to the command at the position of the screen,
wherein the executed command sets parameters of the reproduction of the stream, the set parameters including one of an audio parameter and a subtitle parameter,
wherein:
the command is to change the parameters to display a predetermined language in a subtitle to be displayed on the screen and to change the parameters to play an audio track of a predetermined language,
the information displayed on the predetermined portion of the screen includes information on grammar related to the contents being displayed on the screen, and
the result is a display of information including information about a phrase being conveyed in the reproduced stream to be displayed on the screen, and
wherein:
the packet is a navigation (NV) packet in a video object unit (VOBU) of an MPEG stream; and
said analyzing the packet comprises searching in one of a presentation control information (PCI) and a data search information (DSI) to determine whether the NV packet contains the command.

14. The computer readable medium of claim 13, wherein said executing the command comprises one of:
resetting predetermined parameters of a system that reproduces the stream, and
displaying information corresponding to the executed command at the position of the screen.

15. The computer readable medium of claim 13, wherein the command comprises a movement command that provides positional information as to the predetermined portion of the screen on which the information is to be displayed.

16. The computer readable medium of claim 15, wherein the movement command is one of GoTo, Link, and Jump.

17. The computer readable medium of claim 13, wherein the result is a display of information including information about grammar related to the contents to be displayed on the screen.

18. The computer readable medium of claim 13, wherein the executed command is one of Compare, SetSystem, and Set.

* * * * *